United States Patent [19]

Grassl

[11] 4,059,066

[45] Nov. 22, 1977

[54] MECHANICAL MOTION SENSOR

[76] Inventor: Reinhold Grassl, 142 S. Miraleste Drive, Apt. No. 203, Miraleste, Calif. 90732

[21] Appl. No.: 690,950

[22] Filed: May 28, 1976

[51] Int. Cl.² .............................................. G01P 13/00
[52] U.S. Cl. ................................ 116/115; 116/114 R
[58] Field of Search ........... 116/115, DIG. 21, 124 A, 116/114 R; 74/814, 813; 102/80

[56] References Cited

U.S. PATENT DOCUMENTS 1,666,672  4/1928  Varaud .................................... 102/80

Primary Examiner—S. Clement Swisher
Assistant Examiner—Denis E. Corr
Attorney, Agent, or Firm—Fulwider, Patton, Rieber, Lee & Utecht

[57] ABSTRACT

There is disclosed a motion sensor which may be utilized for sensing rotary motion and incorporating a housing formed with a vertical barrel having pins projecting diametrically inwardly from the opposite sides thereof and terminating in spaced apart relationship. Received telescopically in the barrel between the pins is a cylindrical float formed on its opposite sides with outwardly opening reliefs forming at their upper extremities downwardly concave arches for resting on the pins and each forming a pair of horizontally spaced apart flutes extending downwardly on opposite sides of a vertical rib which terminates at its upper extremity in an upwardly facing abutment surface aligned centrally below such arch for selective engagement with the pins as the float is telescoped upwardly in such barrel. Consequently, the float will normally be suspended from the barrel by engagement of the arches with the pins to thus align such rib directly below the pins and upon raising of the float vertically upwardly the abutment surfaces will engage such pins to limit further upward movement. However, when the float is rotated in one direction or the other during its vertical upward travel the ribs will be rotated to one side of the pins thus allowing such pins to pass downwardly in the flutes to permit further upward travel of the float.

10 Claims, 11 Drawing Figures

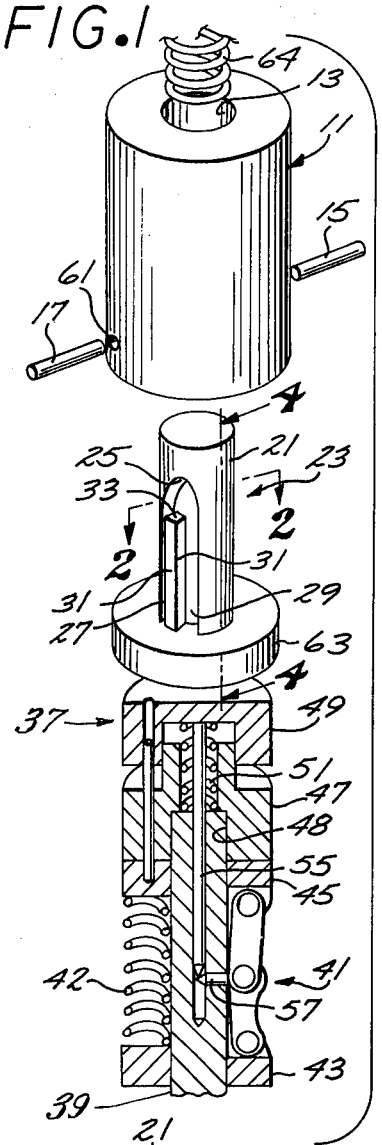
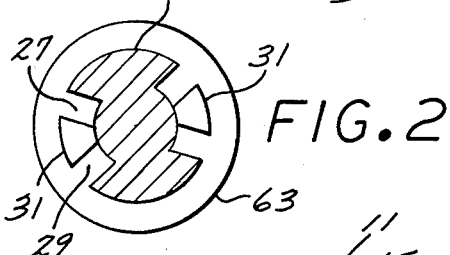
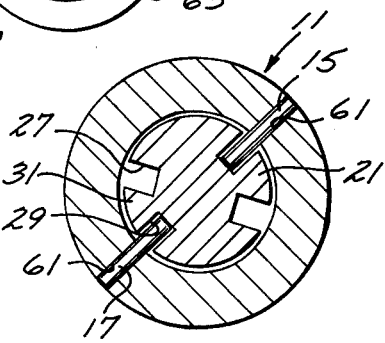
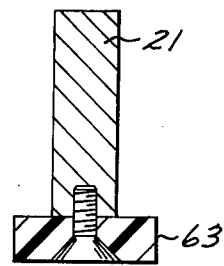
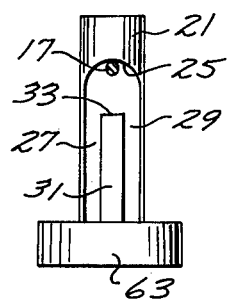
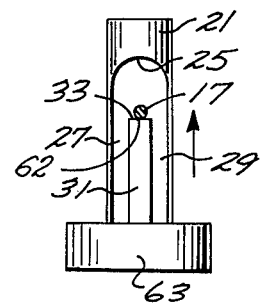
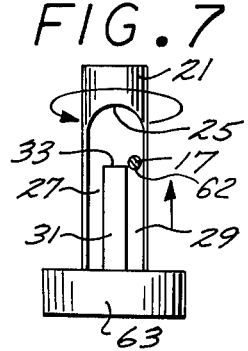
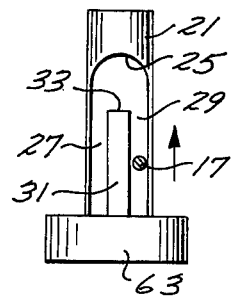
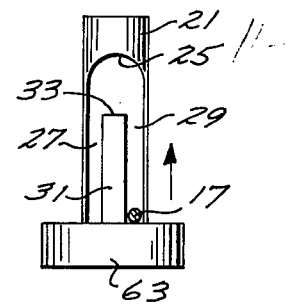
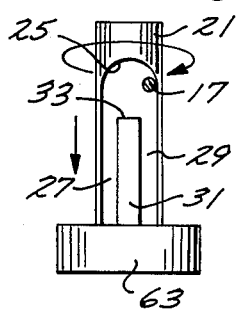
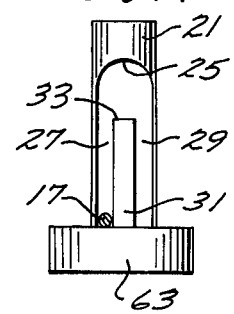

MECHANICAL MOTION SENSOR

BACKGROUND OF THE INVENTION

1. Field of the Invention

The motion sensor of the present invention relates to a device for detecting either rotary or translational motion.

2. Description of the Prior Art

Numerous sensors have been proposed for detecting rotary or translational motion to render control devices operative or inoperative or to trigger other control mechanisms. These prior art sensors suffer the general shortcoming that they are expensive to manufacture and many fail to provide positive motion sensing.

SUMMARY OF THE INVENTION

The motion sensor of the present invention is characterized by a vertical chamber for receipt of a vertically shiftable float which is formed in at least one side with a relief defining a vertical passage extending downwardly beyond an upwardly facing abutment surface normally aligned beneath a downwardly stop surface projecting into such chamber. Alignment means is provided for normally aligning the abutment surface directly below the stop means whereby raising of the float vertically will cause the abutment means to engage the stop means but shifting of the abutment means horizontally during lifting of the float will cause it to clear the stop means allowing such stop means to be received in the passage thereby signaling the existence of such horizontal movement.

DESCRIPTION OF THE DRAWINGS

FIG. 1 is an exploded perspective view of a rotary sensor embodying the present invention;

FIG. 2 is a transverse sectional view, in enlarged scale, taken along the line 2-2 of FIG. 1;

FIG. 3 is a transverse sectional view, in enlarged scale, taken through the suspension housing included in the sensor shown in FIG. 1;

FIG. 4 is a longitudinal sectional view taken along the line 4-4 of FIG. 1;

FIGS. 5-11 are schematic views depicting operation of the sensor of present invention.

DETAILED DESCRIPTION OF THE PREFERRED EMBODIMENT

The sensor of the present invention may be utilized as a rotary sensor and in that embodiment includes, generally, a tubular suspension housing 11 formed with a vertical barrel 13 and having suspension pins 15 and 17 projecting diametrically inwardly from the opposite sides thereof to form downwardly facing stop faces. Received within the barrel 13 is a cylindrical shank 20 of a float, generally designated 23, which includes radially outwardly opening reliefs disposed on the diametrical opposite sides thereof and formed at their upper extremities with downwardly opening alignment arches 25. Such reliefs extend downwardly from the arches 25 to form passage flutes 27 and 29 separated by vertical ribs 31 which terminate in their upper extremity in abutment surfaces 33 aligned vertically beneath the apex of the arches 25 and normally disposed in vertical alignment with the stop pin 17. Consequently, the float 23 will be normally suspended from the radially inner extremity of the stop pins 17 as engaged beneath the apex of the arches 25 to assume a set position whereby engagement with the bottom of such float on its bottom by a driver and raising thereof vertically without rotation thereof will cause the abutments 23 to engage and sense the bottom face of the stop pins 15 and 17 to limit further upward travel of such float relative to the suspension housing 11. However, when any driver contacting the float 23 is rotating, such float will be rotated during its upward travel to rotate such abutment surfaces out of vertical alignment with the stop pins 15 and 17 to align such stop pins with the flutes 27 and 29 to free such float for further upward travel within the housing 11, thereby indicating rotation of such driver.

As described in my co-pending patent application entitled TOOL CHANGER APPARATUS, filed Mar. 8, 1976, and bearing U.S. Ser. No. 664,880, abandoned, the sensor of the present invention may be utilized as a safety device for preventing inadvertent release of a tool carried in the spindle of a vertical milling machine when such spindle is rotating but to permit release of such tool when the spindle is retracted while not rotating.

In that application, the suspension housing 11 is described as being mounted from the stationary frame of the milling machine and the float 23 suspended therefrom in vertical alignment with a release, generally designated 37, mounted on the spindle of such machine for selectively releasing the tool carried in the spindle. Since the tool release 37 is described fully in said co-pending patent application and forms no part of the present invention, it is described here only to set an environment in which the sensor of present invention may operate.

The release 37 sits on a cylindrical draw bar 39 which projects downwardly and connects at its lower end to a gripping mechanism (not shown) operative in response to shifting upwardly of such bar to grip the tool being held thereby. Vertical shifting of the draw bar 39 is controlled by means of three toggle links, generally designated 41, which are spaced at 120° spacings about the bar 39 and are pivotally mounted at their lower extremities on a collar 43 through which the draw bar freely telescopes and are connected on their upper extremity to a collar 45 which has a hat-shaped fitting 47 sitting on the top thereof. Such fitting 47 is formed with a stepped bore 48 having the top of the draw bar 39 anchored in the lower extremity thereof and has its upper extremity freely telescoped into a downwardly opening hollow cap 49 which is biased upwardly relative thereto by means of a coil spring 51 telescoped on its lower extremity into the upper extremity of the stepped bore 48 and sitting upon the top end of the draw bar 39.

An axial bore projects downwardly from the top of the draw bar 39 and has an actuating pin 55 telescoped thereinto and projecting upwardly through the coil spring 51 to abut the interior of the cap 39 with its upper extremity thus carrying such cap thereon. A radial bore leads outwardly from the lower extremity of the actuating pin 55 and has a pusher pin 57 telescoped thereinto for engaging its radially outer end with the toggle links 41 to urge them outwardly to selectively free the draw bar 39 for telescoping upwardly with respect to the collar 43 upon collapse of such links to release the tool being held at the lower extremity of the rod 39.

In the preferred embodiment, the tubular suspension housing 11 is formed with diametrical through bores 61 for press fit receipt of the respective stop pins 15 and 17 which may be driven thereinto upon assembly to project diametrically into the chamber 13 to engage the arches 25 and restrain the float from dropping out of such chamber as well as forming downwardly facing stop faces 62 (FIG. 6).

The float 23 is formed at the bottom extremity of the cylindrical shank 21 with an enlarged-in-diameter circular rim 63 which forms the bottom end of the flutes 27 and 29 and has the limit rib 31 projecting vertically upwardly therefrom.

The preferred embodiment of the sensor of the present invention is intended for sensing rotary motion in either direction of the spindle cap 49 and consequently incorporates vertically extending flutes 27 and 29 on either side of the limit ribs 31 to act as paths through which the stop pins 15 and 17 may pass during upward travel of the float 23 when the spindle is rotating in one direction or the other.

A coil compression spring 64 is conveniently mounted in the housing 11 to engage the top end of the float and urge it downwardly. It will be appreciated that such spring is optional with a vertically projecting sensor but will be required in a tool incorporating a horizontal spindle.

The suspension housing 11 and float 23 may easily be assembled by merely telescoping the shank 21 upwardly into the barrel 13 and driving the stop pinsl 15 and 17 into the press fit bores 61 sufficiently far to project the radially inner extremities thereof in the respective reliefs forming the flutes 27 and 29 and alignment arches 25 but short of actual contact with the radially inner surface of such reliefs, thus leaving the float 23 free to float upwardly and downwardly as dictated by travel of the spindle cap 49. The suspension housing 11 may then be mounted from the stationary frame of the milling machine with the float 23 in axial alignment with the spindle cap 49.

In operation, the float 23 will normally be suspended from the stop pins 15 and 17 which are engaged with the apex of the alignment arches 25 as shown in FIG. 5 to cause such float to seek a rotary orientation with the abutment surfaces formed by the top of the limit ribs 31 aligned vertically beneath such stop pins such that retraction upwardly of the spindle will cause the non-rotating spindle cap 49 to engage the bottom of such float 23 raising it vertically upwardly to engage the abutment surfaces 33 with the bottom surfaces of the stop pins 15 and 17 as shown in FIG. 6, thus limiting further upward travel of the float. Further upward travel of the spindle carrying the draw bar 39 against the spindle cap 49 will raise such draw bar 39 against the bias of the coil spring 51 to raise such draw bar relative to the actuator pin 55 thus driving such pin downwardly in its bore to thus drive the pusher pin 57 radially outwardly against the toggle links 41, thereby driving such toggle links radially outwardly over center to free the draw bar 39 for limited downward travel to release the gripping mechanism on the lower extremity thereof to release the tool being held thereby. Subsequently, when the spindle is lowered the toggle links 41 will be shifted back to the locked position, as shown in FIG. 1, thus drawing the bar 39 upwardly to again grip the tool to be held thereby.

If at a subsequent point in time the spindle is retracted upwardly during rotation thereof in a clockwise direction as viewed from the top thereof, the spindle cap 49 will engage the float raising the arches 25 off the stop pins 15 and 17 and rotating such float clockwise to the degree permitted by the vertical edges of the flutes 29 as shown in FIG. 7, thus carrying the limit rib 31 clockwise out from beneath vertical alignment with the stop pins 15 and 17 to align such stop pins with the flutes 29 themselves. Thus, the float acts to sense such rotary motion and alignment of the flutes 29 with the respective stop pins 15 and 17 creates a pathway for such flutes to pass upwardly carrying the abutment surfaces 33 past the stop pins 15 and 17 as shown in FIGS. 8 and 9, thus avoiding unwanted actuation of the release 37.

If at a different point in time the spindle is retracted while rotating in a counterclockwise direction as viewed from the top thereof, the cap 49 will engage the float 23 carrying it upwardly off the stop pins 15 and 17 and rotating such float counterclockwise to the degree permitted by the vertical edge of the flutes 27 as shown in FIG. 10, again carrying the abutment surfaces 33 out of alignment with the stop pins 15 and 17 and aligning the flutes 27 with respective stop pins to form a path for receipt of such stop pins as the float travels upwardly relative thereto (FIG. 11) and again avoiding unwanted actuation of the release 37.

From the foregoing, it will be apparent that the sensor of the present invention provides an economical and foolproof means for sensing motion and actuating a release, trigger mechanism or other control mechanism in response to the sensed motion or nonexistence of such sensed motion.

Various modifications and changes may be made with regard to the foregoing detailed description without departing from the spirit of the invention.

I claim:

1. A motion sensor comprising:
   a housing formed with an elongated float chamber and including stop means projecting into said chamber and formed with a stop face facing longitudinally in one direction;
   an elongated float telescoped into said chamber, said float being sized for free rotation about its longitudinal axis and longitudinal travel in said chamber and having a first position at one end of its longitudinal travel, a second position at the opposite end thereof and an intermediate sensing position;
   abutment means on said float and including an abutment surface facing said stop when said float is in its first position for engaging said stop;
   passage means in said float extending longitudinally past one side of said abutment means; and
   alignment means normally aligning said abutment surface longitudinally with said stop face when said float is in its first position whereby rotational and longitudinal travel of said float in said chamber from said first position to proximate said sensing position will cause said surface to clear said stop face thus causing said stop means to be received in said passage means for further longitudinal travel of said float relative to said housing thus indicating such rotation has occurred.

2. A motion sensor as set forth in claim 1 wherein:
   said chamber is in the form of a cylindrical bore and said stop means includes pin means projecting diametrically inwardly from the apparatus sides thereof; and
   said alignment means includes a pair of concave arches formed on the opposite sides of said float and opening in said one direction and arranged to engage said pin means when said float is in said first position.

3. A motion sensor as set forth in claim 2 wherein:

said passage means commences at said arches and projects longitudinally therefrom to form passages on said opposite sides of said float and forming paths passing on opposite sides of said abutment surfaces.

4. A motion sensor as set forth in claim 3 wherein:
said abutment means includes a pair of limit ribs projecting longitudinally from said abutment surfaces to bifurcate said passages.

5. A motion sensor as set forth in claim 2 wherein:
said passage means includes passages on opposite sides of said float, commencing at said arches and leading longitudinally therefrom to pass on both sides of said respective abutment means; and
said abutment means includes a pair of limit ribs projecting longitudinally from said abutment surfaces to bifurcate said passages.

6. A motion sensor as set forth in claim 2 wherein:
said chamber is disposed to orient said one direction upwardly.

7. A motion sensor as set forth in claim 1 for use as a rotary sensor and wherein:
said chamber is in the form of a cylindrical bore and said stop includes pin means projecting diametrically inwardly from the opposite sides thereof; and
said alignment means includes a pair of concave arches formed on the opposite sides of said float and opening in said one direction for normally resting on said stop means.

8. A motion sensor as set forth in claim 1 wherein:
said stop means includes second stop means projecting transversely inwardly from the opposite side of said chamber; and
said abutment means includes abutment surfaces disposed on opposite sides of said float and facing said one direction for longitudinal alignment with said second stop means.

9. A motion sensor as set forth in claim 1 that includes:
bias means biasing said float in said one direction.

10. A motion sensor as set forth in claim 1 wherein:
said passage means projects longitudinally past the side of said abutment opposite said one side.

* * * * *